United States Patent
Bak et al.

(10) Patent No.: US 10,073,908 B2
(45) Date of Patent: Sep. 11, 2018

(54) FUNCTIONAL SPACE-TIME TRAJECTORY CLUSTERING

(71) Applicant: International Business Machines Corporation, Armonk, NY (US)

(72) Inventors: Peter Bak, Yokneam Ilit (IL); Yuval Nardi, Kibbutz Kiryat Anavim (IL); Eli Packer, Givataim (IL)

(73) Assignee: International Business Machines Corporation, Armonk, NY (US)

( * ) Notice: Subject to any disclaimer, the term of this patent is extended or adjusted under 35 U.S.C. 154(b) by 333 days.

(21) Appl. No.: 14/738,989

(22) Filed: Jun. 15, 2015

(65) Prior Publication Data

US 2016/0364472 A1    Dec. 15, 2016

(51) Int. Cl.
G06F 17/30    (2006.01)
G06T 11/20    (2006.01)

(52) U.S. Cl.
CPC ...... *G06F 17/30601* (2013.01); *G06T 11/206* (2013.01)

(58) Field of Classification Search
None
See application file for complete search history.

(56) References Cited

U.S. PATENT DOCUMENTS

| | | | | |
|---|---|---|---|---|
| 5,655,060 A * | 8/1997 | Lucas | ................... | B25J 9/1664 318/560 |
| 8,855,361 B2 * | 10/2014 | Millar | ................ | G06K 9/00785 382/103 |
| 8,874,412 B2 | 10/2014 | Weinstein et al. | | |
| 2011/0024126 A1 * | 2/2011 | Brouwer | ................. | E21B 43/30 166/369 |
| 2012/0170802 A1 * | 7/2012 | Millar | ................ | G06K 9/00785 382/103 |
| 2014/0098919 A1 * | 4/2014 | Kumakhov | ............ | G21K 1/087 376/199 |
| 2015/0116597 A1 * | 4/2015 | Chandraker | ........... | H04N 5/147 348/699 |
| 2016/0179923 A1 * | 6/2016 | Chehreghani | ....... | G06F 17/3071 707/637 |

FOREIGN PATENT DOCUMENTS

CN    201210290571    2/2014

OTHER PUBLICATIONS

Gaffney et al, "Curve Clustering with Random Effects Regression Mixture", 2003.*
Gaffney et al, "Trajectory Clustering with Mixtures of Regression Models", 1999.*

(Continued)

*Primary Examiner* — Hung Le
(74) *Attorney, Agent, or Firm* — Ziv Glazberg

(57) ABSTRACT

A method, apparatus and computer program product for Functional Space-Time Trajectory Clustering. The method comprises receiving collections of data structures comprising location and time descriptors. The method further comprises estimating functional curves from the collections of data structures. The method further comprises reducing dimensions of the functional curves; and clustering the functional curves into clusters.

16 Claims, 3 Drawing Sheets

(56) References Cited

OTHER PUBLICATIONS

Julien Jacque et al., "Clustering multivariate functional data", HAL, COMPSTAT 2012, 2012, Cyprus. pp. 353-366, Submitted on Feb. 8, 2014.

Maike Buchin et al., "Segmenting trajectories: A framework and algorithms using spatiotemporal criteria", Journal of Spatial Information Science, No. 3 (2011), pp. 33-63.

Jacopo Aleotti et al., "Arm gesture recognition and humanoid imitation using functional principal component analysis", Intelligent Robots and Systems (IROS), IEEE/RSJ International Conference on Nov. 3-7, 2013.

Francesca Bruno et al., "Clustering Compositional Data Trajectories", vol. 22, Issue 8, pp. 975-984, Dec. 2011.

* cited by examiner

FUNCTIONAL SPACE-TIME TRAJECTORY CLUSTERING

TECHNICAL FIELD

The present disclosure relates to analyzing location information in general, and to clustering trajectories received from digital devices, in particular.

BACKGROUND

In recent years an enormous amount of data and in particular geographic data, is being emitted by many different sources. Some of the data is attributable to smart devices, such as mobile phones, sensors, and other location-aware devices that leave frequent traces of their whereabouts.

The data received from each such device may be regarded as one or more collections of data structures, wherein each such data structure comprises a time stamp and a location indication. Since the time and place data provides for calculating kinematic measures, each such collection may be regarded as a trajectory.

However, the amounts of data being collected are so large, that current techniques are useless in trying to analyze them.

There is thus a need for a method and apparatus for analyzing vast amounts of geographical data for practical uses, such as obtaining insights, planning routes, detecting deviations from routes, or the like.

BRIEF SUMMARY

One exemplary embodiment of the disclosed subject matter is a computer-implemented method comprising: receiving collections of data structures comprising location and time descriptors; estimating functional curves from the collections of data structures; reducing dimensions of the functional curves; and clustering the functional curves into clusters.

Another exemplary embodiment of the disclosed subject matter is a computerized apparatus having a processor, the processor being adapted to perform the steps of: receiving collections of data structures comprising location and time descriptors; estimating functional curves from the collections of data structures; reducing dimensions of the functional curves; and clustering the functional curves into clusters.

Yet another exemplary embodiment of the disclosed subject matter is a computer program product comprising a computer readable storage medium retaining program instructions, which program instructions when read by a processor, cause the processor to perform a method comprising: receiving collections of data structures comprising location and time descriptors; estimating functional curves from the collections of data structures; reducing dimensions of the functional curves; and clustering the functional curves into clusters.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
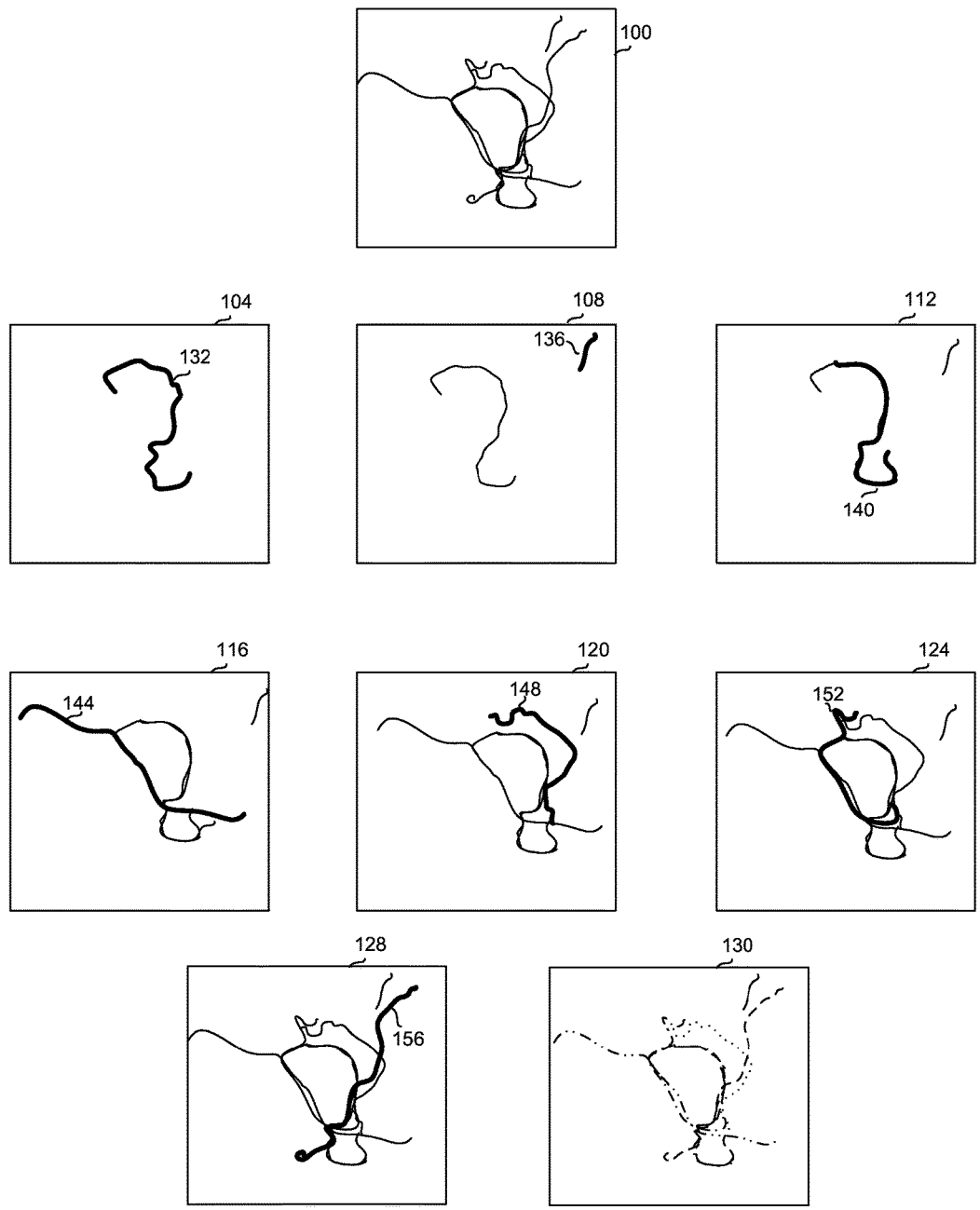
FIG. 1 shows a collection of routes obtained from clustering trajectories, in accordance with some exemplary embodiments of the subject matter.

One technical problem dealt with by the disclosed subject matter is the need to analyze vast amount of geographic information received from mobile sources such as mobile phones, sensors, and other location aware devices that leave traces of their whereabouts.

The traces of such devices constitute points along trajectories, which are spatio-temporal entities that involve sequences of space and time. Thus, velocity or acceleration values may be determined at time points along the trajectory. Trajectories may also comprise additional domain-specific variables.

Each individual trajectory and even more so trajectory collections, reveal spatial and spatiotemporal aspects of clients' or assets' behavior, and thus contain important and valuable information, such as typical movement patterns. This information may be used for a variety of commercial, environmental, security-related, or other purposes, such as planning routes, predicting movements, detecting deviations from expected trajectories such as when smuggling goods, to name just a few.

One technical solution is to use clustering techniques in order to cluster trajectories into groups, wherein each trajectory is given as a collection of data strictures comprising time and location information. Clustering is an analytic tool encompassing many algorithms and embodiments, and is often used in unsupervised machine learning and statistics applications for obtaining overview and insights about typical or expected behavior. The clustering process segments data, which in the current application relates to collections of spatio-temporal indications, into groups, such that sample collections in the same group are more similar to each other than collections belonging to different groups. The groups or representations thereof may be displayed graphically and be used for a multiplicity of purposes.

In existing techniques, trajectory clustering has been conducted using computational geometric approaches or geographic information systems. These methods usually employ an alignment measure or a distance metric between the trajectories, such as the Frechet distance or the Edit distance, but do not consider the statistical distribution of the space-time trajectories, and are therefore hard to leverage for further predictive analytic tasks.

In order to overcome this deficiency, the current application relates to applying tools from the Functional Data Analytic (FDA) approach, which extends classical statistical methods by treating the trajectories as sampled random functions rather than fixed multi-dimensional vectors of data. However, in FDA, trajectories are regarded as time varying quantities, thus neglecting their geographic context.

The combination of tools from these different disciplines provides surprising and useful results.

Thus, the current application relates to a system and method for clustering the spatio-temporal data, comprising:

A pre-processing step during which functional curves are reconstructed from the sets of discrete sample traces. This step incorporates the time dimension into the location information and creates a collection of functions, thus forming trajectories upon which kinematic measures may be estimated, such as velocity, acceleration or others. It will be appreciated that different trajectories may exist along the same path. For example, the trajectory of a car is different from that of a pedestrian or a bicyclist over the same geographical path, and each may need to be identified separately. This step is required also because FDA reasoning conceives discrete traces as realizations of some random continuum]. Although conceptually conceived as random functions, FDA data are usually observed at discrete time points only, and therefore necessitate a pre-processing step in which the underlying curves are reconstructed. This, not only aligns with FDA reasoning, but is also crucial for analyzing trajectories with different time points.

The functions that represent the trajectories, being regarded as functional data, are by their nature, of unlimited dimension. Thus a second step applies functional principal component analysis (PCA), which is a functional dimension reduction technique, and is performed in order to overcome the large number of dimensions. Multivariate functional PCA extends multivariate PCA from vectors to functions using inner products. Multivariate functional PCA finds a set of principal component functions that represent most of the trajectories variability. Raw trajectories are projected onto these principal component functions, leading to dimension reduction and principal component scores. The number of principal component functions used are determined by the cumulative proportion of variability explained (using the eigenvalues of an appropriate Eigen equation system).

Then once all trajectories are given as functions of reduced dimensions, spatial clustering may be performed upon the reconstructed, projected curves, resulting in a set of trajectory groups. The resulting clusters can then be inspected, for example graphically, and optionally over a map to obtain insights and conclusions.

In each of the steps, an interactive approach may be used. This approach starts with using initial values for the parameters as set by an automatic mechanism, and then lets a user change the parameters in according with his or her subjective judgement to improve the results.

Referring now to FIG. 1, showing exemplary results of applying the disclosed steps to a collection of time and location pairs collected from mobile devices within an area. Diagram 100 shows the paths created by the collection of locations with no particular ordering or grouping.

In each of diagrams 104-128 a new trajectory is added. For better visualization, the new trajectory in each diagram is noted in a thick line while the previously indicated trajectories are in thin line.

Thus, diagram 104 indicates trajectory 132, diagram 108 indicates trajectory 136, diagram 112 indicates trajectory 140, diagram 116 indicates trajectory 144, diagram 120 indicates trajectory 148, diagram 124 indicates trajectory 152, and diagram 128 indicates trajectory 156.

Diagram 130 shows all trajectories, wherein each trajectory is patterned differently. However, it will be appreciated that other graphic representation s may be used. For example, each trajectory may be indicated in different color, which may further enhance clarity.

It will be appreciated that trajectory 140 may seem to partly overlap trajectory 132, and trajectory 152 may seem top partly overlap trajectory 144. However, the partial overlap is visual only and does not necessarily reflect the time domain of each trajectory. Thus, two seemingly overlapping trajectories may relate to opposite traffic directions. In another case, such overlapping trajectories may relate to trajectories taken by different transportation means, such as walking, driving, bicycling, or other means having different velocity and acceleration profiles. Differentiating between such trajectories is crucial, since different planning may be required for each such trajectory, including handling overlaps or cross sections, or the like.

Figure 2:
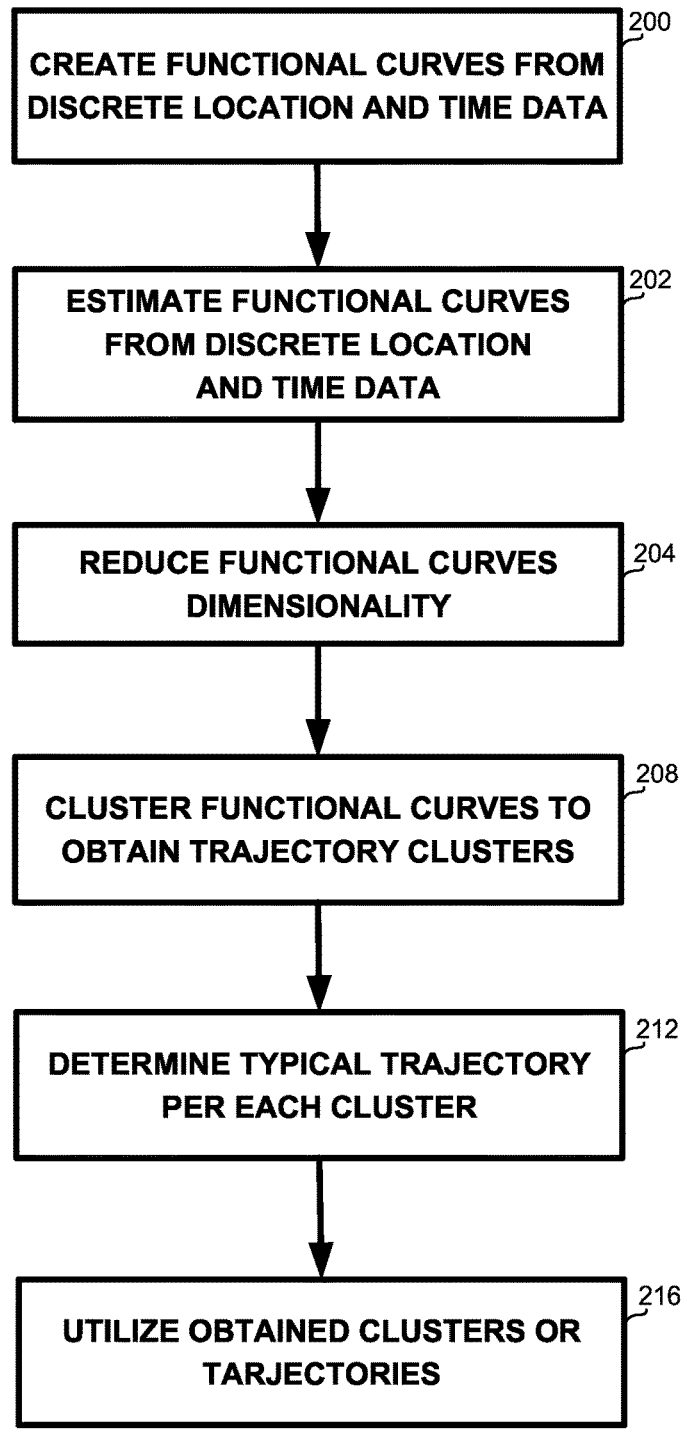
FIG. 2 shows a flowchart diagram of a method for functional space-time trajectory clustering, in accordance with some exemplary embodiments of the disclosed subject matter.

Referring now to FIG. 2, showing a flowchart diagram of a method for functional space-time trajectory clustering.

On step 200, data may be received, such as collections of data structures comprising location and time descriptors. The data may be received directly from users of mobile devices, from a local or remote repository storing the data, from service providers, or the like, using any required protocol or data transfer channel.

On step 202, functional curves, e.g., functions, are estimated from the discrete location and time data received on step 200.

It may be required to reconstruct the function underlying a collection of samples in order to use functional data analysis tools, which treats functional datum as a building block, and also for storing, processing and successfully modeling such data. It is also required since the given time points may not be the same for all trajectories.

Suppose that the given data comprises n collections $Z_1 \ldots Z_n$, each represented as a p dimensional vector, such that $Z_i=(Z_{i1}, Z_{i2}, \ldots Z_{ip})$, for all $i=1 \ldots n$, wherein $Z_{ip}$ comprises time and location indications.

For large values of n or p, such as in the order of magnitude of thousands or more, only recent technologies enable the storage and handling of such large amounts of data.

Functional data analysis regards each such $Z_i$ collection as a sample collection of points of a random function of a continuous parameter such as time, typically, a smoothed stochastic process $[Z(t); t \in T]$, wherein T is the time range, being a real-valued interval. Thus, it is required to represent the data, drawing an analogy to the multivariate case, by n functions $[Z_1(t); Z_2(t) \ldots Z_n(t)]$, which are random elements of infinite dimension, wherein $Z_i(t)=(x_i(t), y_i(t))$, wherein x and y are, respectively, the longitude and latitude at time point t.

Some methods for estimating a function use function basis expansions or non-parametric smoothing. Function basis expansions use basis functions $f_k(t)$, for example the B-splines basis, to express each functional datum as a weighted set of the $f_k(t)$ functions:

$$Z(t) = \sum_k b_k f_k(t)$$

wherein the weights $b_k$ are a set of K functional coefficients, determined for example by least squares minimization, as detailed for example in Jacques, J. and Preda, C. (2013) "*Model-based clustering for multivariate functional data*" appearing in Computational Statistics and Data Analysis, in press, incorporated herein by reference for all purposes. In other embodiments, a non-parametric local regression method, known as locally weighted scatterplot smoothing (LOESS), may be used. LOESS is a local polynomial smoothing technique that uses a k-nearest neighbor approach to control the amount of smoothing.

In a more specific example, let $p(x;\beta)$ be a polynomial of degree K with coefficients $(\beta_0, \beta_1, \ldots \beta_K)$. Then for each trajectory i, the longitude and latitude at a "time" point $t \in T$ may be reconstructed as the polynomials:

$$xi(t)=p(t;\beta^X(t)), yi(t)=p(t;\beta^Y(t)) \qquad (1)$$

wherein the set of coefficients, $\{\beta^X(t)\}$ and $\{\beta^Y(t)\}$ may be determined by minimizing a weighed least squares cost function:

$$\sum_{j=1}^{pi} (\omega_j(t)(y_i(j) - p(j, \beta))^2 \qquad (2)$$

wherein the weights may be given by:

$$\omega_j(t) = \left[1 - \frac{|t-j|^3}{\delta^3(t)}\right]_+^3$$

and wherein $[v]_+ = \max(v, 0)$ and $\delta(t)$ is a bandwidth function or the smoothing parameter, which defines the amount of smoothing applied to each trajectory through a nearest neighbor mechanism.

It will be appreciated that the minimization of equation (2) above over all $\beta$, which leads to the reconstructions in (1), regards the time points at which samples were taken as a fixed consecutive sequence of numbers, 1, 2 . . . $p_i$. This may not be enough for distinguishing between geometrically similar trajectories traced out in different velocities, such as those taken by different motor vehicles, bicycles, or pedestrians. In order to overcome this, the velocity curve may be considered as an additional (derived) functional datum. The reconstruction step may require input parameters: the polynomial degree and the bandwidth $\delta$, wherein both affect the amount of smoothing.

In some embodiments, data-driven methods may be used to choose initial values for the input parameters, such as the polynomial degree, the bandwidth delta, the number of principal component functions, or the like, after which a user may be allowed to adjust these according to subjective measures. The functions are reconstructed to provide smooth trajectories by removing noise and outliers while preserving the data variability.

The reconstructed curves or trajectories as obtained on step 202 are infinite dimensional statistical variables, being a part of an infinite dimensional function space. Dimension reduction step 204 is performed over these functions, in order to allow further analysis.

In some embodiments, principal component analysis (PCA) may be used. PCA aims at finding a lower dimensional representation of the data, which captures most of the inherent variability. Functional PCA (FPCA) extends PCA to the case where data elements are functions rather than vectors. Individual functions may be mapped to a leading principal component, by maximizing the variance of the principal component score: $S_i = \int \alpha(t) Z_i(t) dt$ subject to the constraint $\int \alpha^2(t) dt = 1$. The weight function $\alpha(t)$ may be referred to as the loading function. Higher order, such as second, third, or the like, principal components may be defined similarly with an extra constraint which makes the principal component scores mutually orthogonal. For example, the following constraint, $\int \alpha_2(t) \alpha_1(t) dt = 0$ may be added to the maximization problem defining the second loading function $\alpha_2(t)$. However, it will be appreciated that in practice, integrals are approximated by appropriate sums.

After this estimation, the reconstructed data contains n curves, and the time samples of each trajectory are no longer required. Instead the curves may be used to evaluate longitude and latitude, as well as other attributes if applicable, over a fine grid of "time" points.

For example, the grid size may be denoted as M, and equation (1) above may be used for obtaining n*2M values (for each of the n trajectories, x and y values are estimated for each of the M grid points). For each trajectory the 2M values are determined and standard PCA is applied.

The size of the grid, M, and the number of principal components are input parameters to the method. Initial values of M may be selected by inspecting the amount of smoothness appearing in the trajectory data, but may also result from some automatic data-driven choice.

The number of principal component terms may be determined by assuring that the amount of explained data variability is above a given threshold, such as 90%. This amount may be quantified using the eigenvalues of the sampled variance matrix. In typical cases, no more than 4 eigenvalues are needed.

On step 208, once the functions' dimensions are reduced, the data may be clustered to identify clusters of trajectories. Clustering may be performed using any required method, such as K-means clustering, hierarchical clustering, model-based clustering, or the like.

It will be appreciated that the techniques described above are exemplary only, and any other relevant technique may be used for estimating functions based on the collected data, and clustering the functions to obtain significant trajectory information.

On step 212, the obtained clusters may be further processed, for example for determining a trajectory typical of each such cluster, for example by computing the mean or median trajectory for each cluster.

On step 216, the clusters or the typical trajectories may be used, for example by displaying them on a display device, or otherwise presenting or analyzing them, drawing operational conclusions or the like.

Figure 3:
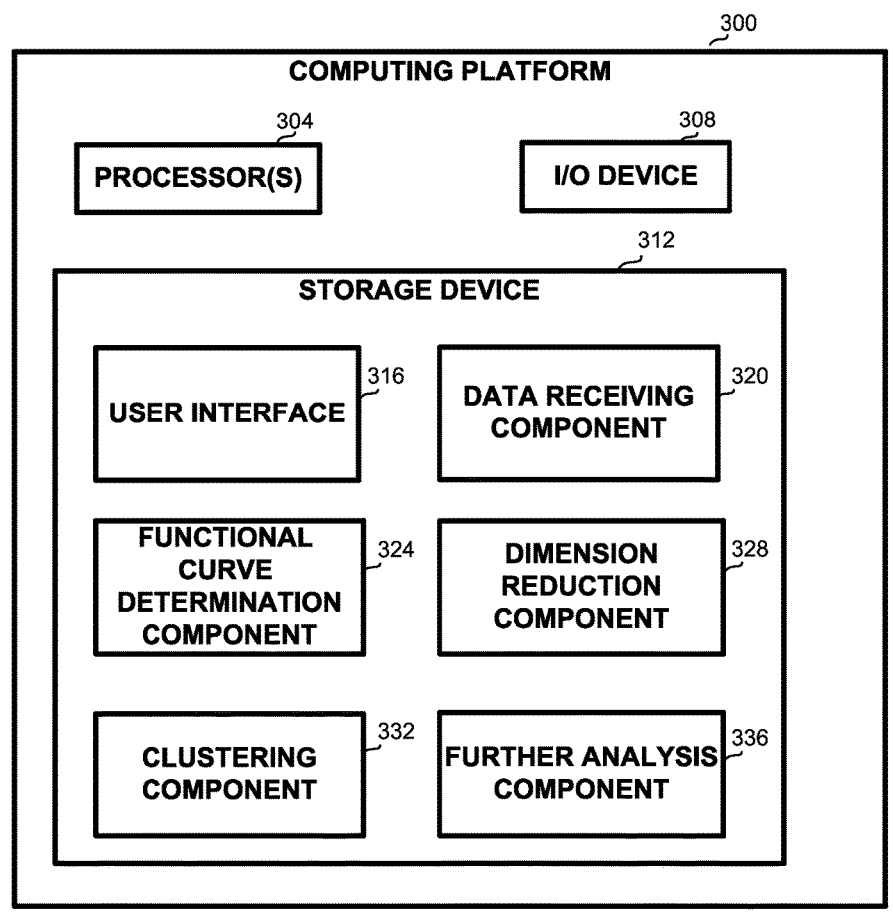
FIG. 3 shows a block diagram of an apparatus for functional space-time trajectory clustering, in accordance with some exemplary embodiments of the disclosed subject matter.

Referring now to FIG. 3, showing an apparatus 300 for functional space-time trajectory clustering.

Apparatus 300 may comprise one or more processor(s) 304. Processor 304 may be a Central Processing Unit (CPU), a microprocessor, an electronic circuit, an Integrated Circuit (IC) or the like. Processor 304 may be utilized to perform computations required by the apparatus 300 or any of it subcomponents.

In some exemplary embodiments of the disclosed subject matter, apparatus 300 may comprise an Input/Output (I/O) device 308 such as a display, a pointing device, a keyboard, a touch screen, or the like. I/O device 308 may be utilized to provide output to and receive input from a user.

In some exemplary embodiments, apparatus 300 may comprise a storage device 312. Storage device 312 may be a hard disk drive, a Flash disk, a Random Access Memory (RAM), a memory chip, or the like. In some exemplary embodiments, storage device 312 may retain program code operative to cause the processor 304 to perform acts associated with any of the subcomponents of apparatus 300. The components detailed below may be implemented as one or more sets of interrelated computer instructions, executed for example by processor 304 or by another processor. The components may be arranged as one or more executable files, dynamic libraries, static libraries, methods, functions, services, or the like, programmed in any programming language and under any computing environment.

Storage device 312 may comprise user interface module 316 for a user to enter information such as parameters, display results such as graphically display trajectories over a display device or the like. The user may iteratively set or alter parameters related to any of the stages detailed on FIG. 2 above and examine the effect on the results.

Storage device 312 may comprise data receiving component 320 for receiving data such as collections of data structures comprising location and time descriptors. The data may be received directly form users of mobile devices, from a local or remote repository storing the data, from service providers, or the like, using any required protocol or data transfer channel.

Storage device 312 may comprise functional curve determination component 324 for determining functional curve based on each collection of such location and time pairs, as described in association with step 200 of FIG. 2 above.

Storage device 312 may comprise dimension reduction component 328 for reducing the dimension of the functions determined by functional curve determination 324, as described in association with step 204 of FIG. 2 above.

Storage device 312 may comprise clustering component 332 for clustering the functions after the dimension reduction, as described in association with step 208 of FIG. 2 above.

Storage device 312 may comprise further analysis component 336 for performing further analysis of the final or intermediate results, such as determining a trajectory typical of a trajectory cluster.

It will be appreciated that each of the components described above may be a proprietary component or a third party engine, component or another executable unit suitable for performing the relevant step.

It will be appreciated that the obtained data, for example the clustered trajectories may be used for a variety of purposes, such as but not limited to: planning and designing routes or intersections, planning public transportation, or the like. When planning, the cluster sizes may also be taken into account, as they may indicate the current or expected usage volume. The clustered trajectories may also be used for detecting deviations from typical routes, such as when committing a crime.

It will also be appreciated that the disclosure is not limited to two dimensional data and may also be used for aerial route planning. The disclosure is also not limited to land areas and may also be used for determining or investigating nautical routes.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
receiving collections of data structures of discrete spatio-temporal data defined on a continuum, wherein each collection of data structures comprising location, time, and velocity descriptors, wherein each collection of data structures is based on readings from different transportation means;
estimating functional curves from the collections of data structures, wherein the functional curves comprise at least a velocity curve; wherein each functional curve comprises a function of time to represent each descriptor of a collection of data structure estimated thereby;
reducing dimensions of the functional curves; and
clustering the functional curves into clusters, whereby said clustering differentiates trajectories of different transportation means.

2. The method of claim 1, further comprising determining a typical trajectory for at last one cluster.

3. The method of claim 1, further comprising displaying the clusters graphically.

4. The method of claim 3, wherein each cluster is displayed as a trajectory typical to the cluster.

5. The method of claim 3, wherein each cluster is displayed with a different color or pattern.

6. The method of claim 1, wherein estimating the functional curves is performed using locally weighted scatterplot smoothing.

7. The method of claim 1, wherein reducing the dimensions of the functional curves is performed using principal component analysis.

8. The method of claim 1, wherein the collections of data structures comprise a first collection and a second collection, wherein the first and second collections represent overlapping trajectories of different transportation means, wherein said clustering comprises associating the first and second collections with different clusters.

9. A computerized apparatus having a processor, the processor being adapted to perform the steps of:
receiving collections of data structures of discrete spatio-temporal data defined on a continuum, wherein each collection of data structures comprising location time, and velocity descriptors, wherein each collection of data structures is based on readings from different transportation means;
estimating functional curves from the collections of data structures wherein the functional curves comprise at least a velocity curve; wherein each functional curve comprises a function of time to represent each descriptor of a collection of data structure estimated thereby;
reducing dimensions of the functional curves; and
clustering the functional curves into clusters, whereby said clustering differentiates trajectories of different transportation means.

10. The computerized apparatus of claim 9, wherein the processor is further adapted to determine a typical trajectory for at last one cluster.

11. The computerized apparatus of claim 9, wherein the processor is further adapted to display the clusters graphically.

12. The computerized apparatus of claim 11, wherein each cluster is displayed as a trajectory typical to the cluster.

13. The computerized apparatus of claim 11, wherein each cluster is displayed with a different color or pattern.

14. The computerized apparatus of claim 9, wherein the collections of data structures comprise a first collection and a second collection, wherein the first and second collections represent overlapping trajectories of different transportation means, wherein the clustering comprises associating the first and second collections with different clusters.

15. A computer program product comprising a computer readable storage medium retaining program instructions, which program instructions when read by a processor, cause the processor to perform a method comprising:
receiving collections of data structures of discrete spatio-temporal data defined on a continuum, wherein each collection of data structures comprising location, time, and velocity descriptors, wherein each collection of data structures is based on readings from different transportation means;
estimating functional curves from the collections of data structures, wherein the functional curves comprise at least a velocity curve; wherein each functional curve comprises a function of time to represent each descriptor of a collection of data structure estimated thereby;
reducing dimensions of the functional curves; and
clustering the functional curves into clusters, whereby said clustering differentiates trajectories of different transportation means.

16. The computer program product of claim 15, wherein the collections of data structures comprise a first collection and a second collection, wherein the first and second collections represent overlapping trajectories of different transportation means, wherein the clustering comprises associating the first and second collections with different clusters.

* * * * *